United States Patent [19]

Baatrup et al.

[11] 4,266,464
[45] May 12, 1981

[54] HYDRAULIC CONTROL APPARATUS FOR SERVO-MOTOR PARTICULARLY FOR VEHICLE STEERING

[75] Inventors: Johannes V. Baatrup, Sonderborg; Thorkild Christensen, Nordborg; Tage Christiansen, Nordborg; Svend E. Thomsen, Nordborg, all of Denmark

[73] Assignee: Danfoss A/S, Nordborg, Denmark

[21] Appl. No.: 912,209

[22] Filed: Jun. 5, 1978

[30] Foreign Application Priority Data

Jun. 22, 1977 [DE] Fed. Rep. of Germany ....... 2728004

[51] Int. Cl.³ ............................................ F15B 13/042
[52] U.S. Cl. .......................................... 91/29; 60/384; 91/420; 137/630.15
[58] Field of Search ...................... 91/29, 28, 420, 27; 137/630.13, 630.15; 60/384

[56] References Cited

U.S. PATENT DOCUMENTS

| | | | |
|---|---|---|---|
| 3,416,406 | 12/1968 | McCreery | 91/27 |
| 3,623,509 | 11/1971 | Sesseler et al. | 137/630.15 |
| 3,625,007 | 12/1971 | Herndon, Jr. | 91/29 |
| 3,817,154 | 6/1974 | Martin | 91/420 |
| 3,906,991 | 9/1975 | Haussler | 137/630.15 X |
| 4,006,663 | 2/1977 | Baatrup et al. | 91/29 |

FOREIGN PATENT DOCUMENTS 1180398  12/1968  France .......................................... 91/29

*Primary Examiner*—Irwin C. Cohen
*Attorney, Agent, or Firm*—Wayne B. Easton

[57] ABSTRACT

The invention relates to hydraulic control apparatus for a servomotor of the type utilized for vehicle steering systems. Such apparatus has a control circuit controlled by a manually operated device such as a steering wheel and a power circuit connected between the servomotor and a power source such as a hydraulic pump. The power circuit includes resetting apparatus for throttling the return flow branch in a manner so that forces applied to the servomotor in the same direction as actuation are absorbed with a minimum of reactionary movement by the valves on the return flow side of the apparatus.

6 Claims, 4 Drawing Figures

HYDRAULIC CONTROL APPARATUS FOR SERVO-MOTOR PARTICULARLY FOR VEHICLE STEERING

The invention relates to a hydraulic control apparatus for a servo motor, particularly for vehicle steering, comprising a control circuit having a quantity setting device and two control valves of which the first connection is connected to the quantity setting device and the second connection is connected to a respective one side of the servo-motor, and comprising an operating circuit having a pressure regulating device which holds its output pressure equal to the pressure at the first connection of the upstream control valve and two main valves of which the first connection is connected to the pressure regulating device and the second connection is connected to a respective one side of the servo-motor, wherein each control valve and each main valve comprises a servo-member, preferably a piston, biassed in the closing direction by a spring and by the pressure in a first pressure chamber connected by way of a first throttle to the second connection of the control valve and in the opening direction by the pressure in a second pressure chamber connected to the first connection of the control valve, and wherein each main valve servo-member can be additionally biassed on the side remote from the spring by a resetting element, preferably a piston, which is subjected on the one side to the pressure in the second pressure chamber and on the other side to the pressure in a third pressure chamber which is connected by a way of a throttle to a branch associated with the other side of the servo-motor.

Such a hydraulic control apparatus in known in U.S. Pat. No. 4,006,663. It ensures that a quantity of pressure fluid flows to the servo-motor by way of the operating circuit that is approximately proportional to the quantity of pressure fluid as determined by the quantity setting device and arriving by way of the control circuit. This takes place in that the pressure difference occurring at the upstream control valve is also applied to the main valve with the aid of the pressure regulating device. The downstream main valve and possibly the downstream control valve are forcibly held open with the aid of the associated resetting element. In this case the resetting element also causes the main valve to bring about a braking throttle effect when an external force acts on the servo-motor in the adjusting direction. The first pressure chambers associated with the control and main valves as well as the third pressure chamber associated with the resetting element are connected by a respective throttle to a respective one side of the servo-motor. The piston of the resetting element has a substantially larger diameter than does the piston of the associated main valve or control valve.

There are numerous applications in which strong external forces are exerted on the servo-motor when this is adjusted, these forces tending to accelerate the motor in its operating direction. Typical of these are for example vehicles consisting of two parts interconnected by a rotary joint, the servo-motor or two servo-motors engaging both parts to turn the parts relatively to each other and thereby perform the steering. By reason of the aforementioned braking effect, the known control apparatus is bound to prevent adjusting of the servo-motor under the influence of the external force independently of the quantity setting device, i.e. jack-knifing between the front and rear vehicle parts. However, the external force often leads to jurky movement of the servo-motor.

The invention is based on the problem of providing a hydraulic control apparatus of the aforementioned kind in which the servo-motor is continuously adjusted even on the occurrence of external forces.

This problem is solved according to the invention in that the first pressure chamber of each main valve is connected to the first connection of the main valve by way of a second throttle and a switching valve which opens when the main valve is disposed in the return flow branch.

In this construction, the upstream main valve works in known manner. The associated spring is designed so that the orifice cross-section bears a certain relationship to the pressure drop at this main valve. However, when the same main valve is disposed in the return flow branch, the pressure in the first pressure chamber is reduced corresponding to the resistances of the first and second throttles. Consequently only a smaller force need be applied by the resetting apparatus to force the main valve to the open position. In particular the diameter of the piston of the resetting valve can be made smaller than hitherto. Since the valve spring has remained the same, changes in the pressure acting on the resetting element in the third pressure chamber, such as those resulting from the occurrence of an external force, will lead to a smaller adjustment of the main valve than in the known case, where no pressure drop occurred in the first pressure chamber of the main valve during return flow operation.

With a given main valve (cross-section of the servo-member, bias and characteristic of the spring), one can, by selecting the first and second throttle as well as the cross-section of the resetting element, achieve a brake characteristic which excludes any overshooting of the main valve servo-member on the occurrence of an external force, which was hitherto the cause of the jurky motion of the servo-motor. The servo-motor therefore continues to move continuously even on the occurrence of external forces.

With particular advantage, the switching valve is actuatable by the resetting element. This resetting element assumes different operating positions independence on the direction of throughflow. In particular, the switching valve may be arranged in the servo-member of the main valve and be actuatable by an axial extension of the resetting element.

In practice, it has proved desirable for the diameter of the resetting element to be no more than equal to the diameter of the main valve servo-member. This not only leads to the desired reduction in the actuating forces for the resetting element but also permits the arrangement to be of overall smaller construction.

In the known control apparatus, a throttle is provided in the supply line to the third pressure chamber to bring about damping of the motion of the resetting element. This could not, or could not adequately influence overshooting of the main valve because the throttle could not fall below a particular size. Otherwise it would take too long for the resetting element to be moved from its rest position to the position for opening the main valve. According to the invention, however, a defined damping effect can be achieved during braking in that the throttle in the connection to the third pressure chamber is in parallel with a second throttle which is effective only during the starting stroke of the resetting element. In this way the resetting element is rapidly moved to the position for opening the main valve because two throttles are connected in parallel but it can still be displaced slowly in this position because only one throttle is effective, which may be precisely designed for an optimum braking resistance.

A similar effect is achieved if the throttle in the connection to the third pressure chamber is bridged by a check which opens to said pressure chamber. In this case the check valve achieves rapid forward motion whilst the return stroke is damped. This also suffices for preventing hunting.

Yet another alternative is that an auxiliary piston in the resetting element is biassed on one side by the pressure in the third pressure chamber and on the other side by the pressure in the second pressure chamber and a spring supported by the resetting element. The resetting element moves rapidly up to abutment with the servo-member of the main valve. The more the valve spring is compressed, the more intensively must the auxiliary piston be moved against its spring. This likewise leads to appropriate damping.

It is also favourable if the third pressure chamber is connected to the first connection of a valve in the other side of the branch associated with the servo-motor. In this way it is ensured that in the neutral position of the quantity setting device, when all the valves are closed, the occurrence of an external force and a corresponding pressure rise on one side of the servo-motor cannot influence the resetting element and thus one of the main valves. Accordingly, external forces will also not bring about unintentional adjustment of the servo-motor in the neutral position.

This feature can be still further improved in that the third pressure chamber is connected to the first connection of the control valve and the quantity setting device makes a connection between said control valve connection and the tank in the neutral position. By means of this tank connection one ensures that a higher pressure will not affect the resetting element through other influences.

The invention will now be described in more detail with reference to examples illustrated in the drawing, wherein.

Figure 1:
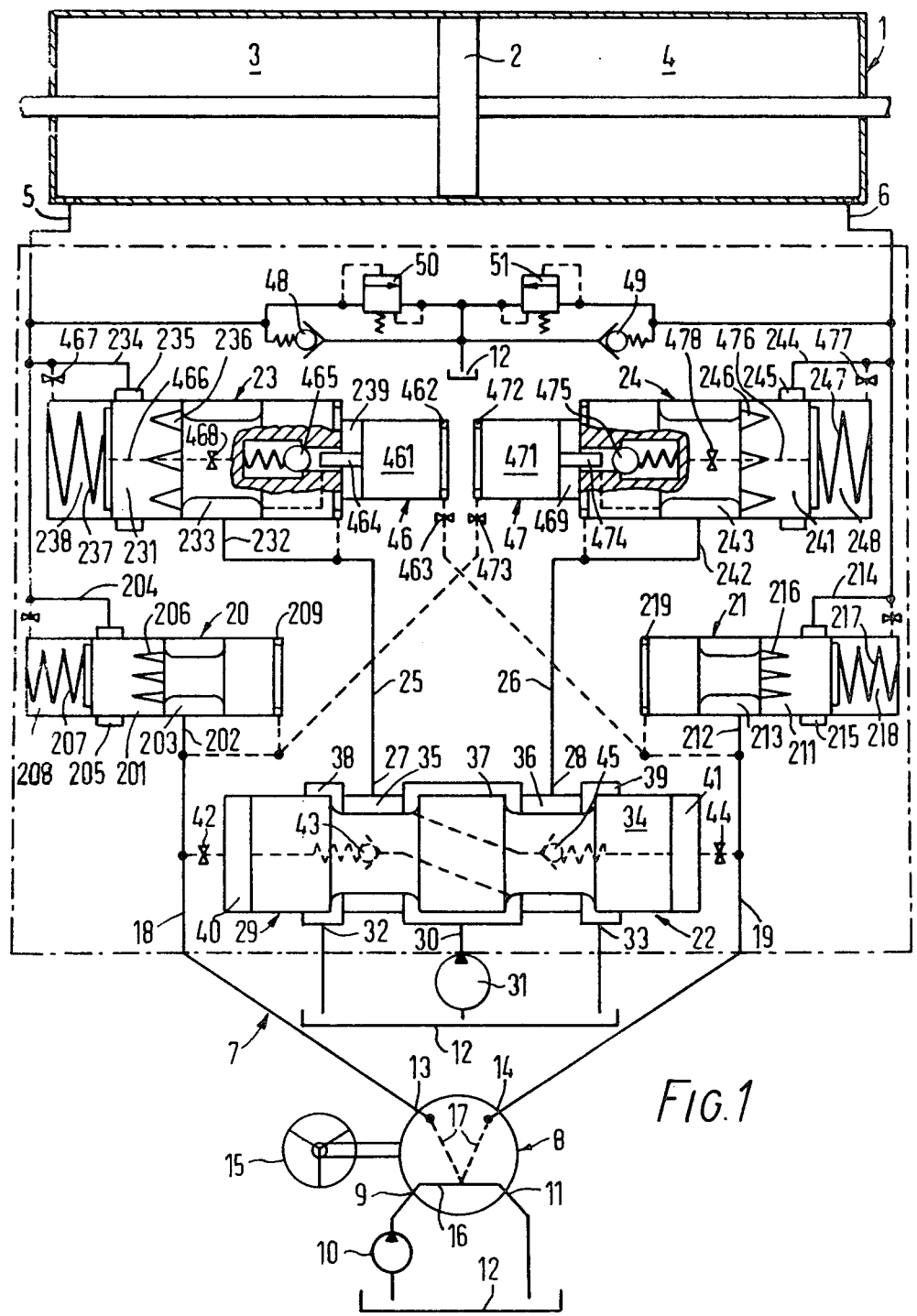
FIG. 1 shows a control apparatus according to the invention in the neutral position.

In FIG. 1, a servo-motor 1 is provided with two sides 3 and 4 which are arranged to both sides of the piston 2 and have connecting conduits 5 and 6.

There is a control circuit 7 comprising a quantity setting device 8 having a connection 9 for a control circuit pump 10, a connection 11 for communication with a tank 12 and two control connections 13 and 14. The quantity setting device is actuated by means of a manual steering wheel such that a quantity of pressure fluid corresponding to the rotary angle of the steering wheel flows from the pump connection 9 to the control connection 13 or 14. In the illustrated neutral position, the pump connection 9 and tank connection 11 are interconnected by a short-circuiting path 16. At the same time, the control connections 13 and 14 are also connected to the tank connection 11 by way of passages 17 in this neutral position. The control circuit comprises two connecting conduits 18 for left-hand operation and 19 for right-hand operation. These lead to a left-hand control valve 20 and a right-hand control valve 21, respectively. The left-hand control valve 20 possesses a piston 201. The first connection 202 communicates with an annular groove 203 in the piston 201 and the second connection 204 communicates with an annular groove 205 in the housing. In the piston there are triangular grooves 206 with which a connection can be established between the annular grooves 203 and 205. In the closing direction, the piston biassed by a spring 207 and the pressure in a first pressure chamber 208 and in the opening direction it is biassed by the pressure in a second pressure chamber 209. Since both pressure chambers are connected to the two connections 202 and 204, the orifice cross-section and the pressure drop at this valve have a predetermined relationship to each other. The control valve 21 has a similar construction, the corresponding parts being designated 211-219. The second valve connection 204 is connected to the connection 5 and the second valve connection 214 to the connection 6 of the servo-motor 1.

The operating circuit 22 comprises two main valves 23 and 24 which have a very similar construction to that of the control valves 20 and 21 and the components of which are therefore designated 231 to 239 and 241 to 249. Whilst the second valve connections 234 and 244 are connected to the servo-motor connections 5 and 6, the first valve connections 232 and 242 connumicate by way of connecting conduits 25 and 26 with the operating connections 27 and 28 of a pressure regulating device 29 which has a connection 30 for an operating circuit pump 31 and two connections 32 and 33 for connecting to the tank 12.

The pressure regulating device 29 comprises a valve slide 34 with two annular grooves 35 and 36. The slide co-operates with three annular grooves 37, 38 and 39 in the housing. At the ends there are pressure chambers 40 and 41. The pressure chamber 40 is connected to the connecting conduit 18 by way of a throttle 42 and to the annular groove 36 by way of a check valve 43. The pressure chamber 41 is connected to the connecting conduit 19 by way of a throttle 44 and to the annular groove 35 by way of a check valve 45. Consequently the pressure regulating device 29 acts as a force comparator in which the slide 34 is displaced in response to the higher pressure in the connecting conduits 18 and 19 and thereby effects throttling such that the pressure in the annular grooves 35 and 36 increases and is led to the opposite pressure chamber by way of the check valve 43 or 45, respectively. In this way the pressure in the operating connections 27 or 28 is equal to the pressure in the connecting conduit 18 or 19 respectively.

Each operating valve 23, 24 is associated with a resetting element 46 or 47. The resetting element 46 comprises a piston 461 which is under the pressure of the second pressure chamber 239 on the one side and under the pressure of a third pressure chamber 462 on the other side. The third pressure chamber is connected to the opposite connecting conduit 19 of the control circuit 7. With the aid of an extension 464, the piston 461 enables a switching valve 465 to be opened which is disposed in a conduit 466 which extends between the two connections 232 and 234 and comprises a first throttle 467 upstream of the first pressure chamber 238 and a second throttle 468 downstream thereof. A similar construction is provided for the right-hand resetting element 47.

The two connections 5 and 6 are connected to the tank 12 in the usual way by way of suction valves 48 and 49 as well as by over-pressure valves 50 and 51.

With such a control apparatus, the following operation is obtained.

In the illustrated neutral position of the quantity setting device, the pressure fluid of the control circuit pump 10 reaches the tank 12 directly by way of the short-circuiting path 16. By reason of the passages 17, the connecting conduits 18 and 19 are also under tank pressure. Consequently, after the quantity setting device has reached the neutral position, the pressure regulating device 29 will likewise immediately assume its neutral position because pressure medium can return rapidly to the tank from the pressure chamber 40 or 41. For this reason the pressure fluid of the operating circuit pump 31 will also flow back directly into the tank 12. All control and main valves 20, 21, 23 and 24 are closed. Pressure peaks occurring on one of the sides of the servo-motor 1 by reason of external forces do not tend to open the valves; nor can the resetting elements 46, 47 be actuated because these pressure peaks cannot become effective in the connecting conduits 18 and 19. Consequently, the piston 2 remains in the given position.

Upon rotation of the manual steering wheel 15 to the right, pressure fluid reaches the control valve 20 by way of the connecting conduit 18, whereby the control valve moves to an open position to an extent corresponding to the quantity. The pressure in the connecting conduit 18 is also produced in the connecting conduit 25 by means of the pressure regulating device 29. Since the valve connections 204 and 234 are interconnected, the same pressure drop arises at the main valve 23 as at the control valve 20. Consequently, the main valve opens such that a quantity of pressure fluid flows through which is proportional to the quantity of pressure fluid flowing through the quantity setting device 8. At the same time the piston 471 of the resetting element 47 is pushed to the right because the third pressure chamber 472 has the high pressure of the connecting conduit 18. This causes the switching valve 475 to be opened and pressure medium will flow from the valve connection 244 to the valve connection 242 by way of the throttle 477, the first pressure chamber 248, the second throttle 478 and the check valve 475. This brings about such a drop in the pressure in the first pressure chamber 248 that the force exerted by the piston 471 on the piston 241 suffices to bring the latter to the right to the open position. In this way the side 4 of the servo-motor 1 is connected to the tank 12 by way of the main valve 24 and the pressure regulating device 29.

If, now, an external force occurs seeking to push the piston 2 to the left, i.e. against the control direction, a pressure pulse is produced on the side 3. This pressure pulse has effect in the first pressure chambers 208 and 238, whereby the control valve 20 and the main valve 23 becomes somewhat closed. The result of this is that the pressure pulse will have practically no effect in the connecting conduits 18 and 25 and in particular will not cause pulses or impacts on the manual steering wheel 15.

If, however, external forces act on the servo-motor tending to move the piston in the control direction, there is the danger that the piston will be displaced more rapidly than it should be according to the movement of the steering wheel. However, such more rapid motion causes the pressure on the side 3 to drop. This pressure drop also leads to a pressure drop in the connecting conduit 18 and thus in the third pressure chamber 472 of the resetting element 47. Consequently the piston 241 of the main valve 24 moves to the left so that more intensive throttling occurs. This leads to braking of the piston motion because the fluid can no longer flow away from the side 4 so rapidly. By reason of the comparatively small diameter of the piston 471 compared with the piston 241 of the main valve 24, pressure variations in the connecting conduit 18 lead to comparatively small force changes which also produce only small displacements of the piston 241 against the valve spring 247, which is required to prevent overshooting. Despite the small diameter of the piston 471, the main valve 24 is normally fully opened because the pressure in the first pressure chamber 248 is reduced on return flow operation by reason of the throttles 477 and 478.

On rotation of the hand wheel towards the left, the pressure fluid is transmitted from the quantity setting device 8 by way of the connecting conduit 19. Mirror-image like conditions will be obtained as in the previously described control.

If the quantity setting device 8 is suddenly set to zero throughflow, the pressure regulating device 29 can react immediately because the connection of the pressure chambers 40, 41 to the tank by way of the passages 17 ensures rapid venting of the pressure chamber having the higher pressure.

Figure 2:
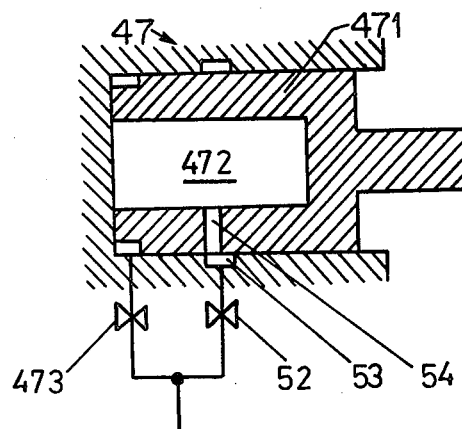
FIG. 2 illustrates a first embodiment of the resetting element.

In the FIG. 2 embodiment, for the resetting device 47 the throttle 473 is connected in parallel with a second throttle 52 of which the conduit terminates in an annular groove 53 fixed with respect to the housing. A passage 54 is provided in the piston 471. Consequently during the starting stroke of the piston 471 both throttles 473 and 52 act in parallel so that the piston can rapidly move to the right, the switching valve 475 can open and the piston 241 can be displaced to the right. During the second part of the stroke, however, the throttle 52 is ineffective. Only the throttle 473 designed for braking is effective. This combines a rapid piston motion as is required for opening the main valve 24 with strong damping as is desired for reliable braking.

Figure 3:
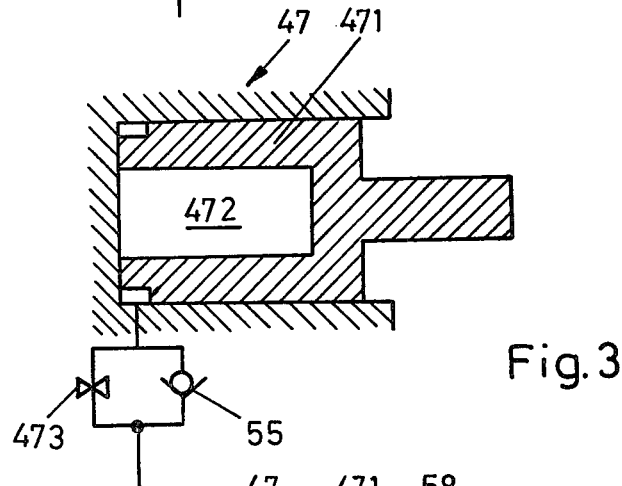
FIG. 3 illustrates a second embodiment of the resetting element.

In the FIG. 3 embodiment, the throttle 473 is in parallel with a check valve 55 which opens towards the third pressure chamber 472. This has the result that the piston 471 moves rapidly in the one direction and can thus also open the main valve 24 rapidly, whereas the motion in the opposite direction is intensively damped. Here, too, one can additionally ensure that the piston 241 will not be caused to oscillate.

Figure 4:
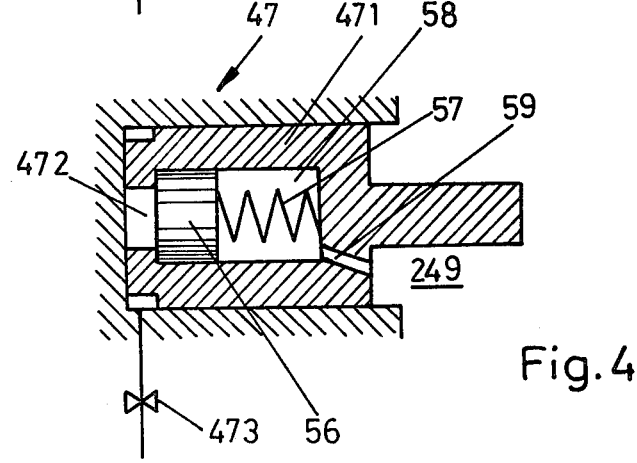
FIG. 4 shows a third embodiment of the resetting element.

In the construction according to FIG. 4, an auxiliary piston 56 is inserted in the piston 471, which auxiliary piston is biassed on the one side by the pressure in the third pressure chamber 472 and on the other side by a spring 57 as well as the pressure in a chamber 58 which communicates with the second pressure chamber 249 by way of a passage 59. In this construction, the piston 471 first moves at a higher speed until it strikes the piston 241 and displaces same some distance to the right. When a counterforce is then built up by compression of the spring 247, the auxiliary piston 56 is displaced to the right against the force of the spring 57. This means that the motion of the piston 471 is retarded even if the same quantity of pressure fluid follows through by way of the throttle 473. In the braking position, compression of the springs 247 and 57 is changed substantially proportionally.

What is claimed is:

1. Hydraulic steering apparatus comprising a servomotor, control circuit means including a quantity setting device and two parallel arranged one way control valves, said one way control valves having inlet connections connected to said setting device and outlet connections connected to opposite sides of said servomotor, said control valves being operable to open or close in dependence upon the presence or absence of fluid pressure at said inlets thereof, a power circuit having a pressure regulating device and two parallel arranged main valves, said pressure regulating device having an inlet connection connectable to a power source and dual outlet connections, said main valves having inlets connected to said dual outlet connections and outlets connected to opposite sides of said servomotor, said main valves each having piston means with valve closing and opening chambers at opposite ends thereof connected respectively to said outlets and inlets thereof, throttle means between said main valve outlets and said closing chambers thereof, valve closing springs in said closing chambers, dual resetting means for biasing said main valves in opening directions, said resetting means each including piston means with a third pressure chamber on one side thereof and one of said valve opening chambers on the other side thereof, conduit means and associated throttle means connecting each said third chamber to operating pressure in said control circuit means from the opposite side of said apparatus, switching valve and throttle means in the piston means of each said main valves between said opening and closing chambers thereof, said resetting means being each responsive to the opposite side operating pressure for opening each of said switching valves when the associated said main valve thereof is in the return flow branch of said apparatus.

2. Hydraulic apparatus according to claim 1, characterized in that each said switching valve in said piston means of the associated one of said main valve is actuatable by an axial extension for each said resetting means for actuating the associated one of said switching valves.

3. Hydraulic apparatus according to claim 1 characterized in that the diameters of said main valve piston means are at least as large as the diameters of said resetting piston means.

4. Hydraulic apparatus according to claim 1 wherein each said conduit means includes second throttle means in parallel with said first stated throttle means thereof which is effective only during the starting stroke of the associated resetting means.

5. Hydraulic apparatus according to claim 1 wherein each said conduit means includes a check valve in parallel to said throttle means thereof which opens to the associated said third pressure chamber.

6. Hydraulic apparatus according to claim 1 wherein each said resetting piston means includes an auxiliary piston internally thereof biased on one side by the pressure in said third pressure chamber and on the other side by the pressure in said second pressure chamber and a spring supported internally of said resetting means.

* * * * *